(12) United States Patent
Metzger et al.

(10) Patent No.: US 12,054,065 B2
(45) Date of Patent: Aug. 6, 2024

(54) METHOD AND CHARGING STATION FOR LOAD MANAGEMENT WITH FALL-BACK SOLUTION

(71) Applicant: Dr. Ing. h.c. F. Porsche Aktiengesellschaft, Stuttgart (DE)

(72) Inventors: Christian Metzger, Tamm (DE); Eric Vogel, Stuttgart (DE); Steve Zander, Marbach am Neckar (DE); Julian Kramer, Stuttgart (DE); Lukas Lindel, Kornwestheim (DE); Moritz Assig, Sindelfingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 32 days.

(21) Appl. No.: 17/108,122

(22) Filed: Dec. 1, 2020

(65) Prior Publication Data

US 2021/0178925 A1    Jun. 17, 2021

(30) Foreign Application Priority Data

Dec. 16, 2019   (DE) ..................... 10 2019 134 508.1

(51) Int. Cl.
*B60L 53/63*       (2019.01)
*B60L 53/50*       (2019.01)
*B60L 53/62*       (2019.01)

(52) U.S. Cl.
CPC ............... *B60L 53/63* (2019.02); *B60L 53/50* (2019.02); *B60L 53/62* (2019.02)

(58) Field of Classification Search
CPC .......... B60L 53/50; B60L 53/62; B60L 53/63; B60L 53/67; G06Q 550/06; H02J 7/0013;
(Continued)

(56) References Cited

U.S. PATENT DOCUMENTS

| 8,106,627 B1* | 1/2012 | Rossi | ..................... B60L 53/14 320/152 |
| 2010/0134067 A1* | 6/2010 | Baxter | .................. B60L 3/0084 320/109 |

(Continued)

FOREIGN PATENT DOCUMENTS

| DE | 202015101557 U1 | 4/2015 |
| WO | 2018209571 A1 | 11/2018 |

OTHER PUBLICATIONS

English Translation of the Chinese Office Action for Chinese Application No. 2020112546229, dated Mar. 19, 2023, 5 pages.

*Primary Examiner* — Richard Isla
*Assistant Examiner* — Johali A Torres Ruiz
(74) *Attorney, Agent, or Firm* — Buchanan Ingersoll & Rooney PC

(57) ABSTRACT

A method for load management of a charging station, in which the charging station is formed by at least two charging points, each with a charging control and a power electronics module assigned to the respective charging point, a charge management server and a transformer connected to an electricity supply network. The network provides a transformer power, in which the load management carried out by the load management server controls an allocation of the transformer power among the respective charging points, in which a respective charging operation of a particular electric vehicle at a particular charging point is controlled via the respective charging control connected to the load management. Charging power controlled by the load management is provided by the respective power electronics module assigned to the respective charging point. The load management has a dynamic and a static execution mode.

24 Claims, 1 Drawing Sheet

(58) Field of Classification Search
CPC ..... Y02E 60/00; Y02T 10/70; Y02T 10/7072; Y02T 90/12; Y02T 90/167; Y04S 10/126; Y04S 30/12
See application file for complete search history.

(56) References Cited

U.S. PATENT DOCUMENTS

| | | | |
|---|---|---|---|
| 2013/0002197 A1* | 1/2013 | Hernandez | B60L 53/30 320/109 |
| 2013/0257146 A1 | 10/2013 | Nojima et al. | |
| 2014/0103866 A1* | 4/2014 | Kothavale | B60L 53/665 320/108 |
| 2014/0217993 A1* | 8/2014 | Rousselle | B60L 53/68 320/157 |
| 2014/0266039 A1* | 9/2014 | Dougherty | B60L 53/67 320/109 |
| 2015/0266389 A1* | 9/2015 | Appelbaum | B60L 58/12 320/138 |
| 2015/0333536 A1* | 11/2015 | Ganem | H02J 50/80 307/104 |
| 2016/0082856 A1 | 3/2016 | Baxter et al. | |
| 2016/0152149 A1 | 6/2016 | Misawa | |
| 2017/0166074 A1 | 6/2017 | Pflaum et al. | |
| 2018/0290556 A1 | 10/2018 | Demont | |
| 2019/0097448 A1* | 3/2019 | Partovi | B60L 53/12 |
| 2019/0184850 A1* | 6/2019 | Lee | B60L 53/66 |
| 2020/0082352 A1* | 3/2020 | Liu | B60L 53/63 |

\* cited by examiner

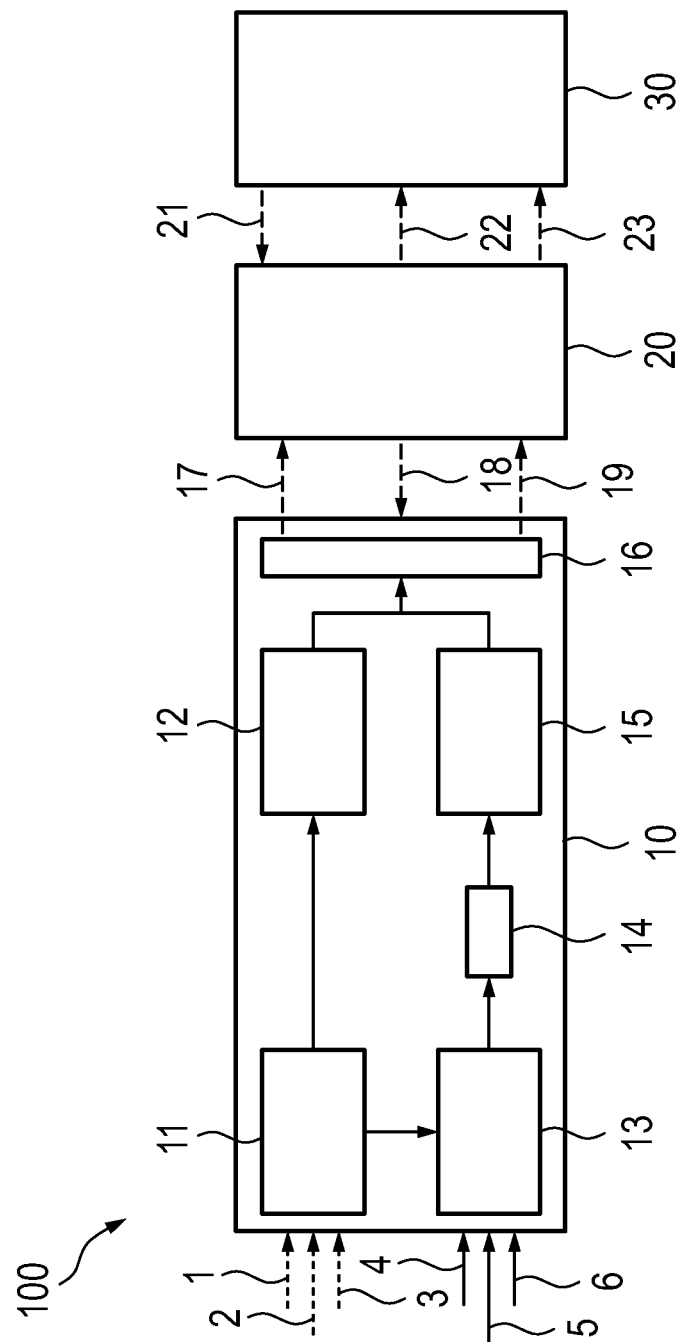

METHOD AND CHARGING STATION FOR LOAD MANAGEMENT WITH FALL-BACK SOLUTION

CROSS-REFERENCE TO RELATED APPLICATION

This application claims priority to German Patent Application No. 10 2019 134 508.1, filed Dec. 16, 2019 the content of such application being incorporated by reference herein in its entirety.

FIELD OF THE INVENTION

The present invention relates to a method for switching between dynamic and static load management in a charging station in the event of a fault. Furthermore, a charging station operated by this method is claimed.

BACKGROUND OF THE INVENTION

A charging station provides electrical power at several charging points for recharging traction batteries of electric vehicles. For this purpose, a transformer of the charging station is usually directly connected to a medium-voltage network of the local electricity supply. Depending on the installation location or installation configuration, the network power and/or transformer power available to the charging station therefore varies or may even be limited. A load distribution is applied locally in a power electronics unit which is connected to the transformer. Power modules of the power electronics are then switched to the individual charging points, which act as a collection of individual chargers among which the available power is evenly distributed. The charging points are galvanically isolated from each other.

In US 2016/0152149 A1, which is incorporated by reference herein, describes a contactless charging system in which a battery charging unit requests charging energy from a power unit. The power unit provides the requested charging energy to a transmission unit, which transfers the charging energy to the battery unit.

In US 2017/0166074 A1, which is incorporated by reference herein, a method for load management in a charging station with multiple charging points is presented. The method determines a statistical model for estimating the amount of energy to be applied and the occupancy time of the respective charging point for an electric vehicle to be charged.

US 2018/0290556 A1, which is incorporated by reference herein, describes a communication system for a plurality of battery management systems that can communicate with each other via a CAN bus. Even if the communication system is restarted, the identification numbers of the individual nodes remain stored on the nodes.

SUMMARY OF THE INVENTION

Against this background, described herein is a method for load management which controls an optimal power supply to the charging points and loads an available power supply efficiently at all times. The load management system is intended to control the power distribution among the charging points in such a way that a supply of power is ensured even in the event of a fault. Furthermore, a charging station operated by this method will be presented.

A method for load management of a charging station is proposed, in which the charging station is formed by at least two charging points, each with a charging control and a power electronics module assigned to the respective charging point, abbreviated as LEM by a person skilled in the art, a load management server and a transformer connected to an electricity supply network, which provides transformer power limited by a network power of the electricity supply network. The load management performed by the load management server controls an allocation of the transformer power among the respective charging points. Each charging operation of an electric vehicle is controlled by the load management at a respective charging point via the respective charging control connected to the load management server. The respective power electronics module assigned to the respective charging point provides a charging power which is controlled or regulated by the load management. The load management has a dynamic and a static execution mode, wherein in the dynamic execution mode the transformer power is allocated to the respective charging points according to at least one specified distribution algorithm, and wherein in the static execution mode the transformer power is distributed evenly between each charging point. If the charging station is in a fault-free system state the load management is carried out in the dynamic execution mode, and in a faulty system state of the charging station it operates in the static execution mode.

The method according to aspects of the invention advantageously provides a maximum transformer power for distribution to the respective charging points in use at any time, in order to achieve the best possible charging performance and high overall system efficiency irrespective of a possible fault. This advantageously avoids excessive power drain from the electricity supply network or from the transformer.

The load management is preferably carried out in the dynamic execution mode, in which the charging power to be distributed is adapted to the respective specifications by means of the at least one distribution algorithm. In the static execution mode, each charging point receives the same charging power, which is obtained from a specified minimum of network power and transformer power by dividing by a number of all charging points, regardless of whether they are active, i.e. whether a charging process is taking place or not.

In one embodiment of the method according to aspects of the invention, the load management is initialized with the dynamic execution mode. From an initial start-up onward, the load management is therefore in the dynamic execution mode and when a system fault occurs it is in the static execution mode.

In a further embodiment of the method according to aspects of the invention a faulty system state is produced by a failure of the load management server and/or by a faulty component of the charging station. According to aspects of the invention, when a faulty system state occurs the charging station falls back on the static distribution of the charging power with a uniform distribution over the respective charging points. For example, this so-called fall-back solution can be programmed permanently at the respective charging points or their respective charging controls, so that charging operations can continue to take place even in the event of total failure of the load management server.

In yet another embodiment of the method according to aspects of the invention, the at least one specified distribution algorithm is selected from the following list:
First-come-first-serve algorithm: let the available charging power in a charging station with six charging points be e.g. 1250 kW. A maximum of 350 kW of charging power is distributed to each charging point, wherein a basic charging power of 10 kW, stored as a coding parameter CaP_Min_AvailablePower in the load management system, is reserved for a particular charging point, even if it is not active. A corresponding coding parameter is created in a similar way to a Unified Diagnostic Services Protocol (UDS) for automotive control units; three vehicles are now to be charged at three charging points, each with 350 kW, so that a fourth vehicle controlling a fourth charging point is only charged with 180 kW. The remaining 20 kW is reserved for the two inactive charging points. In a first scenario, the vehicle at the second charging point is now charged and the second charging point becomes inactive. The load management redistributes the charging power distributed to the remaining active charging points. The respective vehicles at the first and third charging points continue to be charged with 350 kW, but the vehicle arriving later at the fourth charging point will now be charged with 350 kW instead of the previous 180 kW. An active total charging power stored in a coding parameter Dyn_Pot has been reduced from 1230 kW to 1050 kW. In a second scenario, in addition to the four vehicles already at each charging point, two further vehicles arrive, each of which is to be charged at a respective charging point of the two remaining free charging points. However, there is only 10 kW of basic charging power remaining for each of these, until a recharging operation at at least one of the four initially occupied charging points has been completed. In both scenarios, with the redistribution of the charging power controlled by the load management, a previously ongoing charging operation is terminated and a new charging operation is started.

Equal Distribution Algorithm: in this case, an available charging power is divided by the number of active charging points. For example, let the minimum available charging power of the charging station be 900 kW, with the charging station having six charging points and three charging points being used for charging operations. This means that 300 kW is available per charging point. If a further charging point is occupied by a fourth vehicle, 225 kW is provided per charging point (in the static execution mode, each charging point would be provided with 150 kW, whether active or not).

Token Bucket Algorithm: a basic charging power unit of, for example, 10 kW is distributed as a so-called token over the respective charging points, so-called buckets, in a series of iteration steps until a sum of the distributed basic charging power units corresponds to the maximum available charging power. Within a particular iteration step, each charging point is queried as to whether a charging power intended for the respective charging point has been reached and the latter is not receiving any other basic charging power units.

Percentage Distribution: let the minimum of the network power and transformer power minus the peripheral components connected to the same network be 1000 kW, for example. Assume four vehicles are connected in a charging station with six charging points. Of these, the first two vehicles request a charging power of 300 kW and the second two vehicles a charging power of 500 kW, which corresponds to a total requested power of 1600 kW. Then the available charging power of 1000 kW is divided proportionally according to the requested charging power: 300 kW/1600 kW is 18.75%, i.e. 187.5 kW for each of the first two vehicles and 500 kW/1600 kW equals 31.25%, i.e. 312.5 kW each for the second two vehicles.

Optimum Load Distribution: the available charging power between 60% and 80% of a respective rated power of the respective power electronics module is distributed over the respective charging points.

Depending on the distribution algorithm chosen, the maximum possible charging power is thus provided to a particular charging point. The respective distribution algorithm is advantageously permanently programmable, i.e. the respective distribution algorithms are available immediately from the time of initial commissioning of the charging station and do not have to be first adjusted, for example by means of multiple charging operations.

In a further developed embodiment of the method according to aspects of the invention, the at least one distribution algorithm is designed according to customer-specific characteristics or different priorities, at least according to one criterion from the following list:

Customers with premium charging contracts: preference given in charging power level and/or billing costs Charging state of the electric vehicle, also known as "State of charge": a vehicle with a lower charge requirement (short charging time) is prioritized/billed differently than a vehicle with a high charge requirement Time of arrival at the charging station: based on the first-come-first-serve distribution algorithm, electric vehicles are charged with a higher charging power according to their time spent waiting at a particular charging point.

Public authority priority: electric vehicles from authorities such as the police, fire service or emergency vehicles should have priority access to charging points and charging power levels.

Requested charge power level: a vehicle with a high charging power capacity (and thus shorter charging time) and/or a high requested charging power is prioritized/billed differently than a vehicle with a low charging power.

Variations in the local electricity supply network: fluctuating network loads over the course of the day from households and/or companies subscribed to the electricity supply network can result in time slots in which a charging operation is cheaper or more expensive.

In another, further developed embodiment of the method according to aspects of the invention, the method dynamically switches between at least two distribution algorithms depending on the demand for charging power by the respective charging points.

In another embodiment of the method according to aspects of the invention, the load management takes into account at least one additional peripheral element of the charging station, by deriving the charging power to be distributed as the transformer power minus a power requirement of the at least one peripheral element.

Furthermore, a charging station with a load management is claimed, which comprises at least two charging points each with a charging control and a power electronics module assigned to the respective charging point, a load management server, and a transformer connected to an electricity supply network. The transformer is configured to provide a transformer power that can be distributed over the respective charging points from a network power limited by the electricity supply network. The load management server is configured to carry out the load management and in doing so, to control or regulate an allocation of the transformer power among the respective charging points. The load management server is additionally configured to carry out a respective charging operation of a given electric vehicle via the respective charging control in connection with the load management server. The respective power electronics module assigned to the respective charging point is configured to provide a charging power that is controlled by the load management. The load management has a dynamic and a static execution mode, wherein the dynamic execution mode is configured to allocate the transformer power between the respective charging points according to at least one specified distribution algorithm, and the static execution mode is configured to distribute the transformer power evenly between each charging point. The load management is configured to implement the dynamic execution mode when the charging station is in a fault-free system state and to implement the static execution mode when the charging station is in a faulty system state.

In an embodiment of the charging station according to aspects of the invention, the charging station is configured to carry out a method according to aspects of the invention.

In a further embodiment of the charging station according to aspects of the invention, the charging station also has at least one peripheral element and is configured to carry out a method according to aspects of the invention.

BRIEF DESCRIPTION OF THE DRAWING FIGURES

Further advantages and embodiments of the invention are derived from the description and the enclosed drawing.

It goes without saying that the aforementioned features and those yet to be explained below can be applied not only in the corresponding specified combination, but also in other combinations or in isolation without departing from the scope of the present invention.

The sole FIGURE shows a schematic representation of a system overview for a load management in an embodiment of the method according to aspects of the invention.

DETAILED DESCRIPTION OF THE INVENTION

The sole FIGURE shows a schematic representation of a system overview 100 for a load management in an embodiment of the method according to aspects of the invention. The load management in a charging station relates to a load management server 10, at least one power electronics module 20 and a charging control 30 for controlling a charging point. The load management server 10 is a function master and controls or regulates a respective charging power to be provided or being provided at a respective charging point using predefined distribution algorithms according to power characteristics, defined during commissioning, of a network power, a transformer power and after deducting power requirements of optional peripheral components.

When defining a coding parameter CaP_LoadManagement_Type 16, which determines the load distribution, a distinction is made between a static distribution 12 and a dynamic or intelligent distribution 15. A determination of a static distribution takes as input a total available power Basis_Pot 11, which is defined by location-specific coding parameters CaP_MaximumTrafoPower 1 (transformer power), CaP_AvailableNetworkPower 2 (network power) and CaP_MaximumAuxiliaryPower 3 (power requirement for peripheral components). However, the information about the total available power Basis_Pot 11 also enters into a dynamically generated power specification Dyn_Pot 13, which is determined by dynamic input variables with internal signals IS_kW_Freigabe_Trafo 4, IS_kW_Freigabe_VNB 5 (VNB stands for distribution network operator) and IS_kW_Freigabe_FCM 6 (FCM stands for a dedicated subsystem FacilityChargeManager). The power specification Dyn_Pot 13, together with a coding parameter CaP_LM_DistrAlgo 14, which specifies the particular distribution algorithm, determines the dynamic distribution 15. The load management server 10 then communicates via Ethernet with a respective power electronics module 20 using signals LMSXX_PSysStat_freig 17, LMSXX_PSysStat_freig 18 and LMSXX_PDyn_freig_LEMXX 19, and the respective power electronics module 20 communicates with a respective charging control 30 using Ethernet signals LKXXy_EVLA_MaxLadeLeistung 21, LEMXX_MaxLadeLeistung_LKXXy 22 and LEMXX_MaxLadeStrom_LKXXy 23.

A charging operation could proceed, for example, by the load management server 10 determining a desired power of the respective charging points and the respectively associated charging control 30 reporting a desired power of a particular vehicle to the power electronics module 20. The power electronics module 20, in turn, reports the desired power of the respective charging point to the load management server 10 depending on the power requested by the vehicle and taking account of internal derating/operating point. The load management server 10 allocates the available power to the charging points using different distribution algorithms, wherein the load management server 10 performs the power distribution using the particular distribution algorithm chosen. If charging points are prioritized, for example, the load management server 10 prioritizes on the basis of prioritization criteria specified in an overall objective and sends the currently allocated power to the respective power electronics module 20. Based on the control specification from the load management server 10, the respective power electronics module 20 reduces or increases the charging power provided to the respective charging point.

What is claimed:

1. A method for load management of a charging station, in which the charging station includes (i) at least two charging points each with a charging control and a power electronics module assigned to the respective charging point, (ii) a load management server, and (iii) a transformer connected to an electricity supply network, which provides a transformer power limited by a network power of the electricity supply network, said method comprising the steps of:

carrying out the load management using the load management server to control an allocation of the transformer power among the respective charging points;

controlling a respective charging operation of a particular electric vehicle at a particular charging point by the load management via the respective charging control connected to the load management server, in which a charging power controlled by the load management is provided by the respective power electronics module assigned to the respective charging point;

reserving a basic charging power for each charging point, regardless of whether the charging point is active or inactive;

operating the load management in a dynamic execution mode when the charging station is in a fault-free system state, wherein, in the dynamic execution mode, the transformer power is allocated between the respective charging points according to at least one distribution algorithm selected from a plurality of uneven distribution algorithms, and wherein, depending on the demand for charging power by the respective charging points, the dynamic execution mode dynamically switches between the plurality of uneven distribution algorithms which distribute the transformer power to each charging point unevenly over each charging point;

operating the load management in a static execution mode when the charging station is in a faulty system state, wherein, in the static execution mode, the transformer power is distributed evenly over each charging point according to an Equal Distribution algorithm, and wherein each of the plurality of uneven distribution algorithms distribute the transformer power to each charging point unevenly in response to coding parameters including maximum transformer power, available network power, the basic charging power reserved for each charging point, maximum auxiliary power of peripheral elements separate from the electric vehicle, and the at least one distribution algorithm selected from, or switched to, the plurality of uneven distribution algorithms.

2. The method as claimed in claim 1, wherein the load management is initialized with the dynamic execution mode.

3. The method as claimed in claim 1, wherein a faulty system state is produced by a failure of the load management server and/or of the charging station.

4. The method as claimed in claim 1, wherein the at least one specified distribution algorithm is configured according to customer-specific characteristics at least according to the following list: customers with premium charging contracts, charge status of the electric vehicle, time of arrival at the charging station, public authority priority, requested charging power level, and variations in a local electricity supply network.

5. The method as claimed in claim 1, wherein the load management takes into account at least one additional peripheral element of the charging station, by deriving the charging power to be distributed from the transformer power minus a power requirement of the at least one peripheral element.

6. The method as claimed in claim 1, wherein the uneven distribution algorithms include a Token Bucket algorithm where tokens, each including a predetermined amount of power, are iteratively distributed to the respective charging points until a sum of the predetermined amount of power of the distributed tokens reaches a maximum available charging power.

7. The method as claimed in claim 1, wherein the uneven distribution algorithms include a Percentage Distribution algorithm where the power is distributed as a percentage of a respective power request of each of the respective charging points with respect to a total requested power from the respective charging points combined.

8. The method as claimed in claim 1, further comprising dynamically switching between different uneven distribution algorithms, each of which distribute the transformer power to each charging point unevenly over each charging point, depending on a demand by the respective charging points.

9. The method as claimed in claim 8, wherein the step of dynamically switching between different uneven distribution algorithms comprises switching between a Token Bucket algorithm and a Percentage Distribution algorithm.

10. The method as claimed in claim 1, wherein prior to the step of operating the load management in the static execution mode, the method comprises the step of detecting a fault in the charging station.

11. The method as claimed in claim 1, wherein the plurality of uneven distribution algorithms are programmed permanently at each of the at least two charging points.

12. The method as claimed in claim 1, wherein the plurality of uneven distribution algorithms are programmed permanently at each of the at least two charging points, and the plurality of uneven distribution algorithms are available immediately from a time of initial commissioning of each of the at least two charging points and do not have to be first adjusted by means of multiple charging operations.

13. The method as claimed in claim 1, wherein the plurality of uneven distribution algorithms are programmed permanently at the at least two charging points or at a respective charging control of the at the at least two charging points.

14. The method as claimed in claim 1, wherein the plurality of uneven distribution algorithms comprises an Optimum Load Distribution algorithm, wherein an available charging power between 60% and 80% of a respective rated power of a respective power electronics module assigned to the respective charging point is distributed over the respective charging points.

15. The method as claimed in claim 1, wherein the basic charging power for each charging point is stored as a first coding parameter in the load management system.

16. The method as claimed in claim 15, wherein the basic charging power for each charging point corresponds to a second coding parameter of a Unified Diagnostic Services Protocol ("UDS") for the particular electric vehicle.

17. The method as claimed in claim 1, wherein the basic charging power for each charging point indicates a minimum available charging power for each charging point.

18. The method as claimed in claim 1, wherein the transformer power distributed to each of the respective charging points is determined based on a total requested power from each of the respective charging points reduced by the basic charging power for each charging point.

19. A charging station having a load management system comprising:
   at least two charging points each with a respective charging control and a respective power electronics module assigned to the respective charging point,
   a transformer connected to an electricity supply network, wherein the transformer is configured to provide a transformer power from a network power that is limited by the electricity supply network, and
   a load management server configured to carry out the load management, and, in doing so, control an allocation of the transformer power among the respective charging points,
   wherein the load management server is additionally configured to carry out a respective charging operation of a respective electric vehicle via the respective charging control connected to the load management server,
   wherein the respective power electronics module assigned to the respective charging point is configured to provide a charging power controlled by the load management,
   wherein a basic charging power is reserved for each charging point, regardless of whether the charging point is active or inactive,
   wherein the load management has a dynamic execution mode and a static execution mode, the load management being configured to implement the dynamic execution mode when the charging station is in a fault-free system state, and the load management being configured to implement the static execution mode when the charging station is in a faulty system state, wherein the dynamic execution mode is configured to allocate the transformer power between the respective charging points according to at least one distribution algorithm selected from a plurality of uneven distribution algorithms, and wherein, depending on the demand for charging power by the respective charging points, the dynamic execution mode dynamically switches between the plurality of uneven distribution algorithms which distribute the transformer power to each charging point unevenly over each charging point, wherein the static execution mode is configured to distribute the transformer power evenly over each charging point according to an Equal Distribution algorithm, and wherein each of the plurality of uneven distribution algorithms distribute the transformer power to each charging point unevenly in response to coding parameters including maximum transformer power, available network power, the basic charging power reserved for each charging point, maximum auxiliary power of peripheral elements separate from the electric vehicle, and the at least one distribution algorithm selected from, or switched to, the plurality of uneven distribution algorithms.

20. The charging station as claimed in claim 19, which additionally has at least one peripheral element.

21. The charging station as claimed in claim 19, wherein the uneven distribution algorithms include a Token Bucket algorithm where tokens, each including a predetermined amount of power, are iteratively distributed to the respective charging points until a sum of the predetermined amount of power of the distributed tokens reaches a maximum available charging power.

22. The charging station as claimed in claim 19, wherein the uneven distribution algorithms include a Percentage Distribution algorithm where the power is distributed as a percentage of a respective power request of each of the respective charging points with respect to a total requested power from the respective charging points combined.

23. The charging station as claimed in claim 19, wherein the load management is configured to dynamically switch between different uneven distribution algorithms, each of which distribute the transformer power to each charging point unevenly over each charging point, depending on a demand by the respective charging points.

24. The charging station as claimed in claim 23, wherein the different uneven distribution algorithms comprise a Token Bucket algorithm and a Percentage Distribution algorithm.

* * * * *